(12) United States Patent
Edelhaus et al.

(10) Patent No.: US 8,223,951 B1
(45) Date of Patent: Jul. 17, 2012

(54) SYSTEM AND METHOD FOR ALTERNATE PATH ROUTING AND REDUNDANCY BASED ON COST SENSITIVE NETWORK SELECTION

(75) Inventors: Simon Edelhaus, Sharon, MA (US); Sanal Kumar V K, Bangalore (IN)

(73) Assignee: Envid Technologies, Inc., Sharon, MA (US)

( * ) Notice: Subject to any disclaimer, the term of this patent is extended or adjusted under 35 U.S.C. 154(b) by 961 days.

(21) Appl. No.: 12/240,278

(22) Filed: Sep. 29, 2008

(51) Int. Cl.
*H04M 7/00* (2006.01)
(52) U.S. Cl. .............................. 379/221.01; 379/115.01
(58) Field of Classification Search ............. 379/221.01, 379/115.01
See application file for complete search history.

(56) References Cited

U.S. PATENT DOCUMENTS

| | | | |
|---|---|---|---|
| 6,411,684 B1 * | 6/2002 | Cohn et al. ................. | 379/88.14 |
| 6,931,114 B1 | 8/2005 | Martin | |
| 7,065,186 B1 | 6/2006 | Myers et al. | |
| 7,251,479 B2 | 7/2007 | Holder et al. | |
| 7,317,716 B1 | 1/2008 | Boni et al. | |
| 7,412,486 B1 | 8/2008 | Petrack et al. | |
| 2002/0029384 A1 | 3/2002 | Griggs | |
| 2002/0053081 A1 | 5/2002 | Griggs | |
| 2002/0095330 A1 | 7/2002 | Berkowitz et al. | |
| 2002/0122429 A1 | 9/2002 | Griggs | |
| 2003/0046151 A1 | 3/2003 | Abuan et al. | |
| 2004/0161089 A1 | 8/2004 | Hanson et al. | |
| 2004/0186909 A1 | 9/2004 | Greenwood et al. | |
| 2005/0022241 A1 | 1/2005 | Griggs | |
| 2005/0198147 A1 | 9/2005 | Pastro et al. | |
| 2005/0259798 A1 | 11/2005 | Yarlagadda et al. | |
| 2006/0259926 A1 | 11/2006 | Scheelke et al. | |
| 2007/0078709 A1 | 4/2007 | Rajaram | |
| 2007/0097975 A1 | 5/2007 | Rakers et al. | |
| 2007/0174873 A1 | 7/2007 | Griggs | |
| 2007/0189271 A1 | 8/2007 | Borislow et al. | |
| 2007/0201450 A1 | 8/2007 | Borislow et al. | |
| 2007/0230673 A1 | 10/2007 | Hanson et al. | |
| 2008/0043949 A1 | 2/2008 | Tam | |
| 2008/0077960 A1 | 3/2008 | Griggs | |
| 2008/0152101 A1 | 6/2008 | Griggs | |

* cited by examiner

*Primary Examiner* — Quynh Nguyen
(74) *Attorney, Agent, or Firm* — Chapin IP Law, LLC

(57) ABSTRACT

Interpersonal communications initiated from devices such as various phones and voice/chat devices automatically transport via an optimal path by invoking a service selector of communication mediums for selecting at least one of several alternate routing paths for user communications from among available communication mediums common to both an initiator and recipient. A user registration database identifies communication mediums applicable to each user, and identifies or maps an appropriate communication medium between users for completing a particular call. The service selector identifies and intercepts an outgoing communication attempt (call, email, text) from a user, identifies the user and recipient in the database, and selects an optimal communication medium defining an alternate routing path from the initially specified (i.e. default) transport mechanism.

18 Claims, 7 Drawing Sheets

SYSTEM AND METHOD FOR ALTERNATE PATH ROUTING AND REDUNDANCY BASED ON COST SENSITIVE NETWORK SELECTION

BACKGROUND

The telecommunications industry has seen explosive growth in recent decades, due largely to the proliferation of communication networks supporting digital mediums such as Internet and cellular based. While the technology behind traditional wired phones has remained relatively static for some time, wireless and Internet based communication has seen substantial growth. Various services and devices have evolved to provision technological advances to end users. Therefore, while the conventional Public Switched Telephone Network (PSTN) network persists, newer communication mediums continue to evolve, either layered on top of the existing physical infrastructure or developed in parallel, such as the Internet and related digital mediums.

Despite the growth of each individual communication medium, there is very limited automation between different mediums, such as trends toward a "universal" communication mode. Unfortunately, therefore, many communications mediums exist as islands of technology, with little or no integration into other communication mediums. For example, while sitting at home, one either makes a cellphone call or a conventional wired phone call. Alternatively, a user may elect to send an email from a PC or text a message to a recipient. No integration or automatic crossover between these technologies exists. A user makes an active decision about which technology to invoke, and subsequent manually invokes a second, third, etc. alternate to accomplish the communication.

SUMMARY

In a conventional communication scenario, a user makes a conscious decision about which communication medium to invoke to contact a recipient. The user then manually invokes an alternate mechanism if initial attempts are unsuccessful, such as wired line phone, then mobility (i.e. cellphone), then email or text messaging, for example. Current consumer oriented communication mediums represent isolated islands of technology. Each user must manually identify and select a communication medium through which to reach a recipient. Typically this results in a scenario in which an initiator, for example, calls a work phone number, then calls a cell number, tries a home number, then texts the cell device or leaves a voice mail. Conventional telecommunications providers may provide a service to transfer a voice call to a specified ordering of phone numbers, however such services typically employ a fee for services approach that requires all the phone numbers to be within the service and only operate on the voice lines of the carrier telecommunications provider. There is no selection of an alternate transport medium nor of an alternate user mode, such a text, chat or email. There is no consolidated repository or universal selector which can identify and apply a communication medium between arbitrary users.

While some conventional communication service providers allow the ability for a user to specify a device order for routing received calls, such an ordering is unilateral in that it is statically specified by the receiving user. No comparison or consideration of the communication medium of the caller is considered. Further, the decision to invoke an alternate medium is undertaken only after a failed call in a previously attempted medium. No proactive identification of an optimal or preferable medium is performed prior to attempting the communication.

Conventional communication mediums, therefore, suffer from the shortcoming that there is no centralized repository of various communication mediums attributable to particular users, and no mechanism to provide an ordered invocation of available mediums via which a user may be reached. Some services attempt a failover to alternate phone numbers, for example, but this automation does not span multiple technologies (e.g. PSTN, VOIP, text, email), is proprietary to particular subscribers, and is fee based. It would be beneficial to provide a universal repository or registration of users and corresponding communication mediums through which they may be reached, and automatically identify an applicable communication medium between users for a particular communication attempt. It would be further beneficial if such an approach were self sustaining (i.e. immune from user fees) so as to avoid limiting the pool of available recipients to a particular carrier or provider.

Particular configurations discussed herein take the form of a new "personal communicator" service that uses the existing telecom companies' infrastructure—PSTN (Public Switched Telephone Network), Mobile, VOIP (Voice Over IP) or any combination of these three for access, together with several alternative methods for communication, to provide ubiquitous free voice and text connectivity anywhere where telecom equipment exists. The service is taking advantage of existing Telephony, Mobility, Instant Messaging, VOIP and Upstream networks, without changing any of their infrastructures. In particular arrangements, such a service may be funded by advertising revenue or charged to the user via a model to be determined by service providers. As a first step of provisioning this service to a user base, a "User Registration Database" is created. As the new service is advertised to the users online and in mass media, users may be given incentives to register by distributing promotions, gift cards, etc. Alternatively, service providers may choose to automatically register all their existing subscribers into the new service, based on the info which the service providers already posses and store in their existing billing databases.

Accordingly, configurations herein substantially overcome the shortcomings of manual invocation of various communication mediums by providing a service selector of communication mediums for selecting at least one of several alternate routing paths for user communications from among available communication mediums common to both an initiator and recipient. A user registration database identifies communication mediums applicable to each user, and identifies or maps one or more appropriate cheapest communication mediums between users for completing a particular call. The service selector acts as a voice proxy, it identifies and intercepts an outgoing communication attempt (call, email, text) from a user, identifies the user and recipient in the database, and selects one or more optimal cost communication mediums defining alternate routing paths from the initially specified (i.e. default) transport mechanism.

In a conventional voice phone call, relaying on the well-known "twisted pair" wired line for interfacing with the local PSTN network; communications are automatically routed to the service provided by the local dialtone provider. The transport network typically includes conventional PSTN or Mobility switches interconnected with signal transfer points (STP)s conversant in SS7 signaling, as is known in the art. A CO (Central Office) represents the physical location where switching occurs, and switching may occur multiple times in conventional call switching routing a call to the intended recipient. In general, however, at some switching point, a usage fee is levied against the user's account, although the call is transported across at least a portion of the network before reaching the CO triggering such a fee.

The service selector, typically including network switch having the functionality disclosed herein and acting as a voice proxy, is disposed in the conventional transport network so as to intercept the call just prior to triggering a fee-based service invocation by a service provider, and attempts to determine alternate public access (i.e. free) mediums on which to complete the communication. For example, an outgoing voice call on a PSTN or Mobility network is routed to the service selector by the switch in the last CO (central office) to which a call could be routed before triggering a billable event. The switch could determine the rule for routing the call to the service selector by a special prefix or access number that the user could dial. Alternatively, the network could be configured to forward the call to the service selector by default. The service selector identifies the destination recipient, and routes the call via either VOIP or Upstream Voice/Chat network such as Skype®, AIM®, Yahoo Messenger Voice®, Google Talk® and others to the recipient, having obtained the recipient information from the user registration database. In this manner, the service selector establishes user communication between an initiator and recipient by indexing a list of available communication mediums between the users having the most favorable communication attributes (i.e. free or lesser cost), determines at least one of several alternate routing paths via which to complete the communication to the recipient, and invokes the first feasible alternate routing mechanism to transport the message or series of messages included in the communication (i.e. voice connections result in a subsequent series of streaming media and messaging packets).

During a connection interval for establishing communication, user specific feedback may be provided during the conventional "ringback" period (the "ringing" period heard by a caller until the receiving party picks up). Such feedback may include targeted media based on the user data in the user registration database, and may be employed for advertising revenue generation to maintain a fee-free service for users.

More specifically the method of establishing network communications as defined herein includes detecting an outgoing message from an initiator, such that the outgoing message has a default transport mechanism and a recipient, identifying, intercepting and re-routing the message at an intermediate point in a transport network for transporting the message to the recipient. The method implements a service that computes at least one of several alternate routing paths from the intermediate point to the recipient, such that the alternate routing paths are different than the default transport mechanism and common to the recipient and the initiator, such as an Upstream Voice/Chat network or VOIP mechanism available to both. The alternate paths are selected as having preferable communication attributes to the default transport mechanism, typically reduced or no cost. The service, typically implemented as a combination of a voice proxy and a switching device, transports the message via one of the alternate routing paths, identifying a recipient device capable of communication via this alternate routing path, and completing delivery of the message to the recipient via the recipient device. In this manner, users invoke the service to achieve low or no cost communication from an automatically selected communication medium from among the available communication mediums based on an individual user specific identifier operable as a universal communication ID.

The example configuration shown depicts a computing device disposed in communication with a public access network. Various physical deployments will be apparent to those of skill in the art without departing from the scope of the claimed invention. The example computing device includes a highly embedded processor driven appliance having memory and interfaces for performing the steps and actions disclosed herein via instructions encoded in the appliance.

One such alternate deployment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

DETAILED DESCRIPTION

Figure 1:
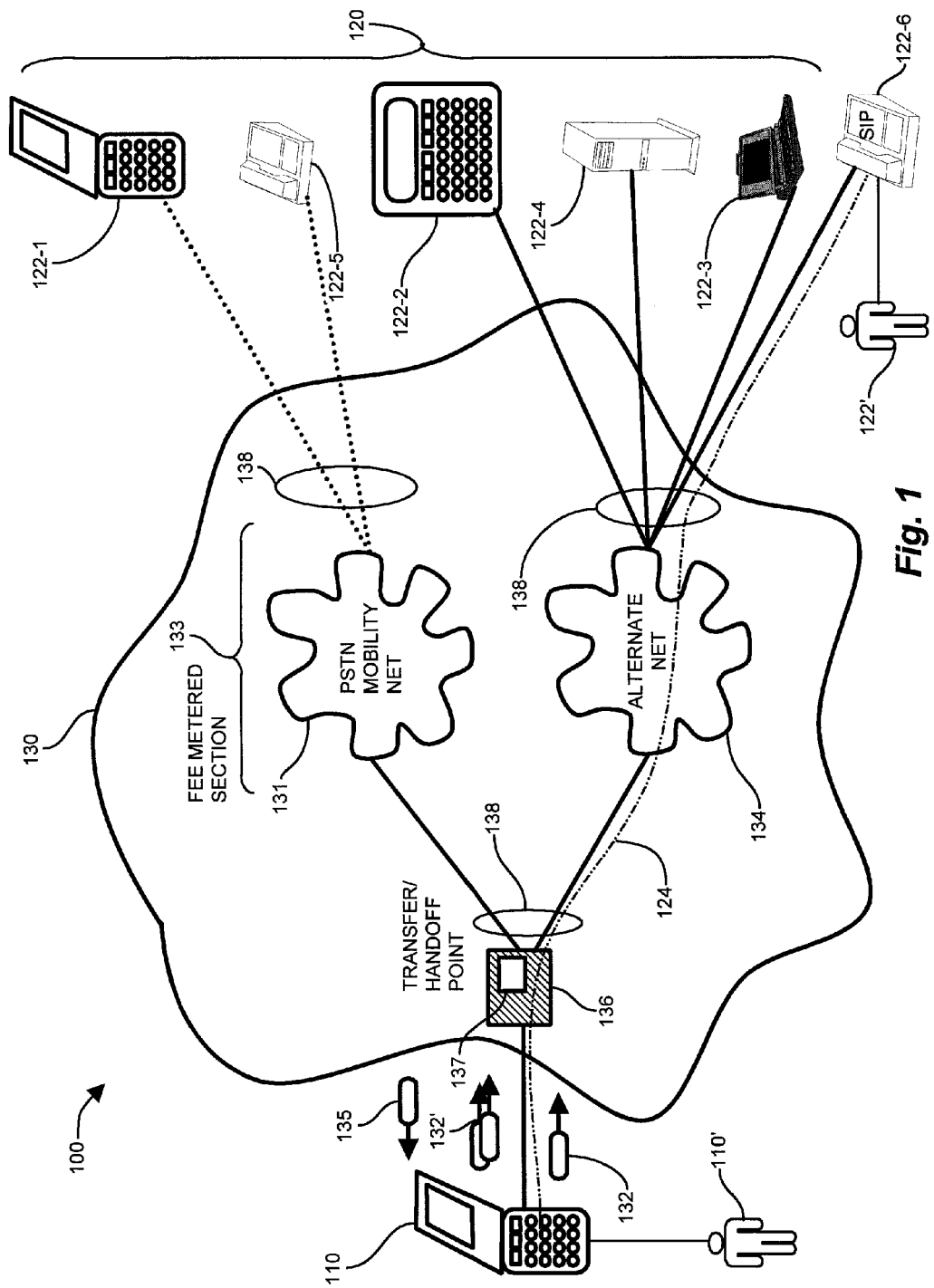
FIG. 1 is a context diagram of a public access network suitable for use with the present invention.

The disclosed approach depicts an example arrangement of identifying and intercepting a call and designating a preferable communication medium from an intermediate point in the communication path. The intermediate point may be, for example, a point prior to invoking any fees from the local carrier (service provider). A transport network denotes a path between an initiator and recipient of a communication. The service provided by the disclosed system identifies, intercepts the communication and redirects the communication from a default route in favor of a more desirable path. The disclosed system presents an example implementation depicting several communication mediums and destination devices by way of example only. Alternate configurations employing the disclosed method may be apparent. Alternate communication mechanisms have been proposed which may be pertinent to the disclosed service and system, which are discussed and distinguished below.

U.S. Pat. No. 7,412,486, to Petrack, et al., discloses a method for processing message data employing a hypertext transport protocol session between the messaging server and the messaging client. The Petrack approach, however, does not disclose installing a voice proxy and a switching device at an intermediate point such as a telecom switching office (i.e. a CO). '486 requires a "user agent" to be run on a PC or a Smartphone or Chat client and the clients connect to the PSTN using the "telephone hosting server" instead of using existing infrastructure—PSTN phones, cellphones & VOIP phones and clients.

Further, '486 does not teach Instant Messaging over PSTN, and does not mention funding a telecommunication service through targeted advertising.

In another example, Ribbit Corporation, based in Mountain View, Calif., has a so-called "SmartSwitch" that takes care of multiple networks, protocols and devices to allow the web to be connected to any device in any manner. The Ribbit disclosure suggests that a web page can call a landline phone, and thus a web application can be transformed into a virtual mobile phone. However, the Ribbit approach employs a service model such that the voice object is embedded into websites, chat client, smart phones etc., and does not suggest advertisement for revenue or chat capabilities via a conventional POTS phone. More specifically, U.S. Publication 20080152101 teaches method and system to establish an Internet telephone call from a terminal device, that includes provision and establishment of telephony services over Internet via a web browser. Examples of a terminal device include a web phone embedded in an http server. Such an approach, however, employs some sort of user client and does not suggest ringback usage for media promotion or revenue from advertisements.

Similarly, U.S. Publication No. 20020122429 suggests a method and apparatus to dynamically change the quality of service (QoS) level of a transmission over a network. This approach receives quality of service requests from user input devices coupled to network gateways, and issues commands for a changed quality of service level for a call according to each request. The '429 approach suggests packet based networks, thus implying Internet usage without crossover into twisted pair (i.e. PSTN) accommodation.

Referring now to the disclosed system and corresponding service, FIG. 1 is a context diagram including a public access network suitable for use with the present invention. Referring to FIG. 1, a communications environment 100 allows an initiator device 110 to establish communication to any one of a plurality of recipient devices 120 via a transport network 130. The initiator device 110 is operable by a user or operator 110' for performing communication with the recipient devices 120, which may for example be a mobile phone 122-1, a smart handset 122-2, Internet enabled laptop 122-3 or desktop computer 122-4, conventional wired (e.g. twisted pair) phone 122-5 or a VOIP phone 122-6. Such a communication 132 may take the form of a voice call, text message, or other suitable communication to any of the various recipient devices 122-1 ... 122-6 (122 generally). Other configurations incorporate video via the use of smart 3G handsets with mobile video, or to VOIP Video Phones.

Such a communication 132 follows a transport path 124 through the transport network 130 from the initiator device 110 to the recipient device 122 using a series of network links 138 provided by a service provider. The initiator (i.e. user 110') of the communication 132 is a subscriber of the service provider, typically a telephone company or cellular carrier, which provides usage of the network 131 on a fee-for-services basis. In a typical communication, the service provider identifies a series of the network links 138 to connect the initiator device 110 to the recipient device 122, over which the communication travels as a series of so-called "hops" from link 138 to link 138. Each such link 138 is defined by a switching point, at which switching and/or routing decisions are made about the next link 138 to be traversed to reach the recipient device 122. In a conventional Public Switched Telephone Network (PSTN) or Mobility Network 131, the switching points include so-called Central Offices (CO), which contain the switching equipment for implementing the routing decisions, usually according to an SS7 protocol, as is known in the art. The service providers meter usage of the communications invoked by a user, and charge a fee based on such usage. Typically this usage is tracked at particular COs along the path 124 to the recipient device 122. Conventional telephone communications relied almost exclusively on fee-based PSTN or Mobility networks 131, however Internet infiltration and expansion has marked an introduced an alternate network 134 of communication carriers and/or protocols, such as Voice Over IP (VOIP) and Upstream Voice/Chat networks such as Skype®, AIM®, Yahoo Messenger Voice®, Google Talk®, as is known in the art.

Configurations herein identify a transfer point 136 defined by the last switching point in the path 124 before a conventional CO imposes a usage charge. In the example arrangement shown, the first hop from the user handset or phone up to the switching office where the transfer point is installed employs conventional technology, such as TDM or Cellular. Transport beyond the central office where the interception point is located is sent upstream using a significantly reduced fee or free medium such as Voice Over IP (VOIP) and Upstream Voice/Chat networks. A communication 132 from a user device 110 is identified at the transfer point 136, and an alternate network 134 is selected for transporting the communication 132 to the intended recipient device 122. The handoff point 136, discussed further below, identifies a no-cost or lowest cost alternative by examining communication mediums invokable by both the initiator device 110 and the recipient device 122, and selectively switches the communication 132 to the selected alternate network 134. During the brief interval while the call or communication 132 is switched to the recipient 122, user specific feedback may be provided to the user device 110 for the period commonly referred to as the "ringback," or "ringing" sound heard by the incoming caller in conventional systems. In configurations disclosed herein, this feedback period of approximately 10-15 seconds may be employed for various purposes, such as user selected tones, predetermined information streams or messages, or targeted media and advertising provided by the service provides.

Figure 2:
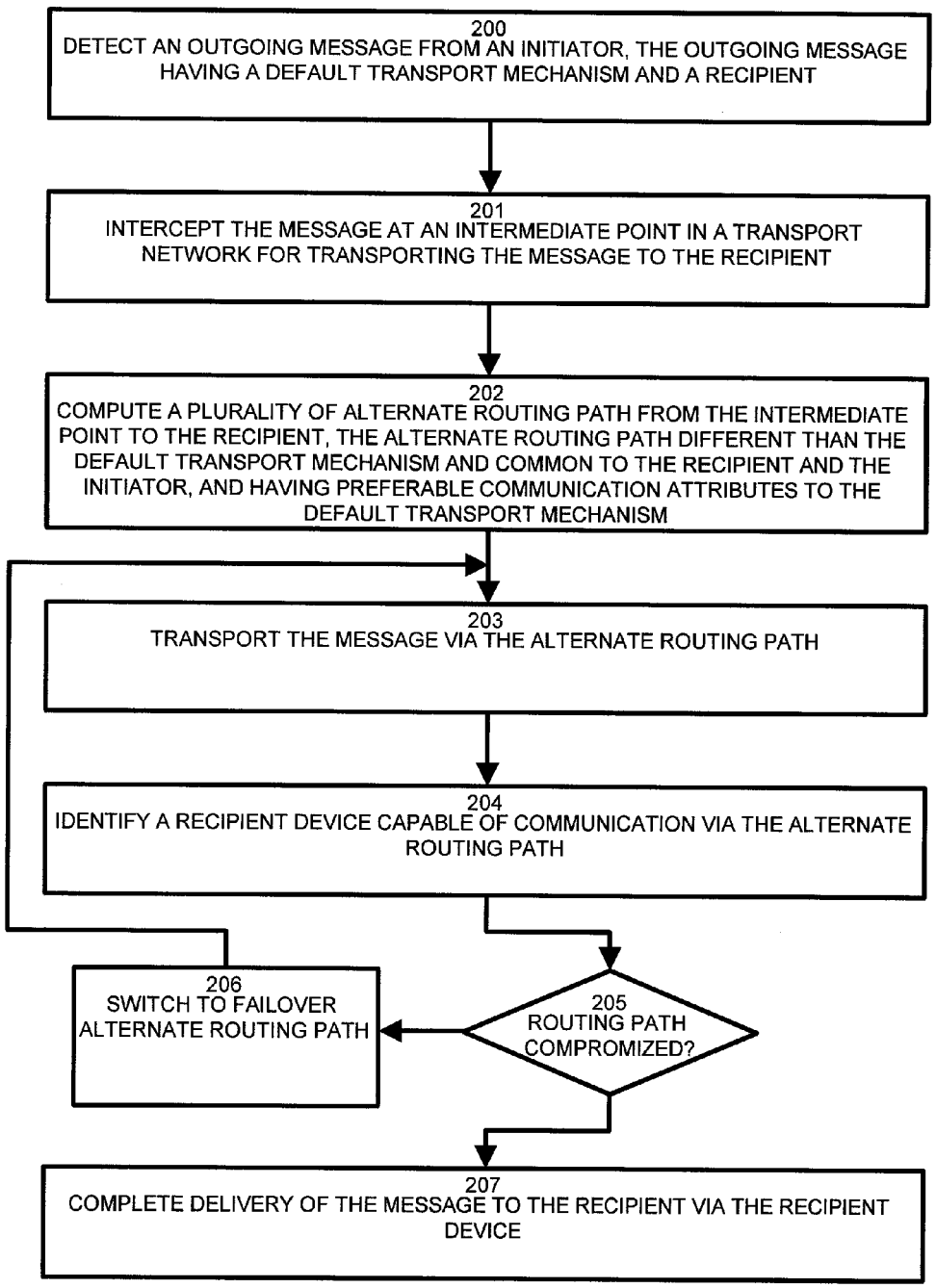
FIG. 2 is a flowchart of call message completion in the network of FIG. 1.

FIG. 2 is a flowchart of call message completion in the network of FIG. 1. Referring to FIGS. 1 and 2, the method of establishing network communications as defined herein includes, at step 200, detecting an outgoing message or communication 132 from an initiator 110', the outgoing message 132 having a default transport mechanism and a recipient 122'. The outgoing message 132 representing the communication 132 may be a single entity, such as a text message, or a series of messages 132' such as streaming voice or video. The handoff point 136 defines the location of an interception device 137 that intercepts the message 132 in the transport network 130 for transporting the message 132 to the recipient 122 via the alternate network 134, as depicted at step 201. The interception device 137 identifies and captures outgoing messages 132 from the initiator 110 at the last fee-free central office (or other suitable switching point) on a path to the recipient 122, defined in the example arrangement as the handoff point 136.

At the handoff point 136, the interception device 137 computes at least one of several alternate routing paths 124 from the intermediate point 136 to the recipient, such that the alternate routing paths 124 are different than the default transport mechanism and common to the recipient 122' and the initiator 110, as disclosed at step 202. Typically, multiple alternative paths are computed and the first valid one is selected, and other alternative paths are identified as potential failover routes. Thus, call quality is monitored and if the first alternate path call fails, the interception device 137 automatically switches over to successive routes without interrupting call. Further, the alternate routing paths 124 have preferable communication attributes to the default transport mechanism through the fee metered section 133 of the network 130. The alternate network 134 transports the message 132 via the first selected alternate routing path 124, as shown at step 203. The interception device 137 identifies a recipient device 122 capable of communication via the alternate routing path 124, based on the mediums subscribed to by the user and devices available via the selected medium, as depicted at step 204. For example, if the communication is a text message, the recipient device 122-N may be a cellphone 122-1. If the communication is a voice message, the recipient device 122-N may also be a cellphone 122-1 or alternatively, a VOIP enabled laptop 122-3. The interception device 137 monitors the selected routing path, and a check is performed, at step 205, to determine if the routing path has become compromised. If a problem develops with the selected routing path, then the interception device switches to another one of the plurality of computed transport paths from step 202, as depicted at step 206, and control reverts to step 203 to continue transport. After selection of the optimal medium defining the alternate network 134 (preferable a cost-free medium such as VOIP or other Internet based medium), and selection of the recipient device 122-N available to the selected medium, the alternate network 134 completes delivery of the message to the recipient 122' via the recipient device 122-N, as depicted at step 207.

Figure 3:
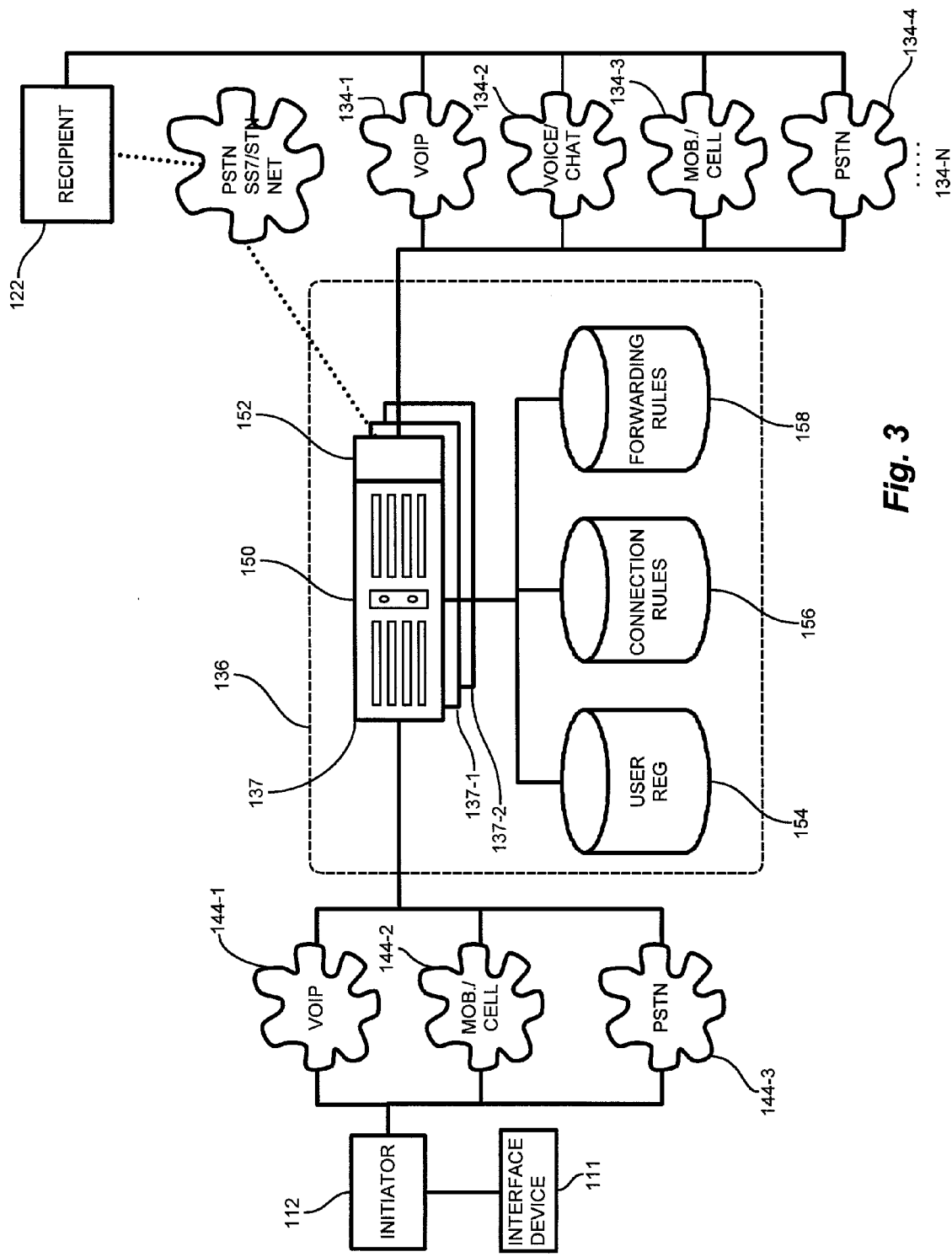
FIG. 3 is a block diagram of call transport as defined in FIG. 2.
Figure 4:
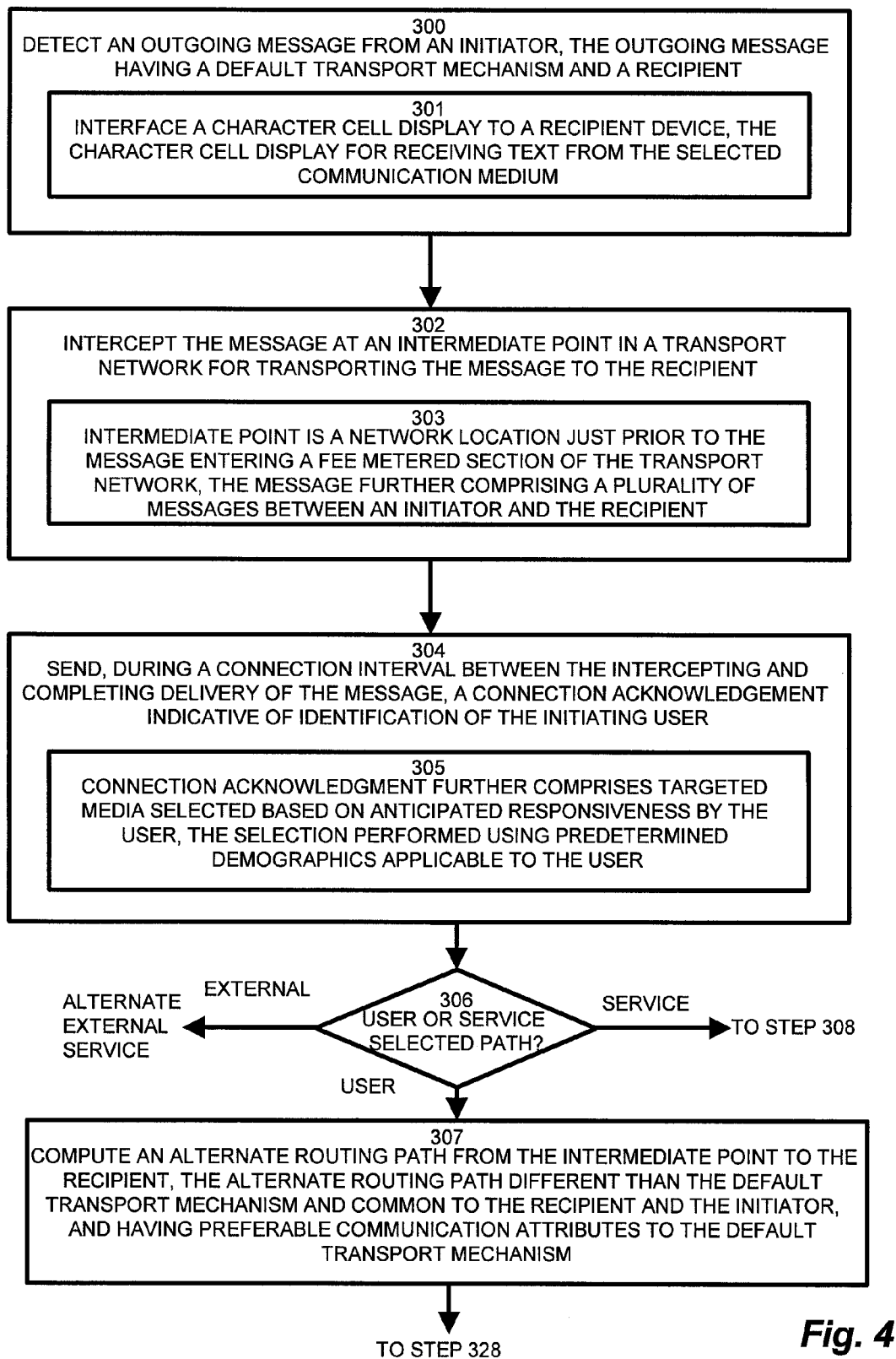
FIGS. 4-7 are a flowchart of transport routing logic employed in FIG. 3.
Figure 5:
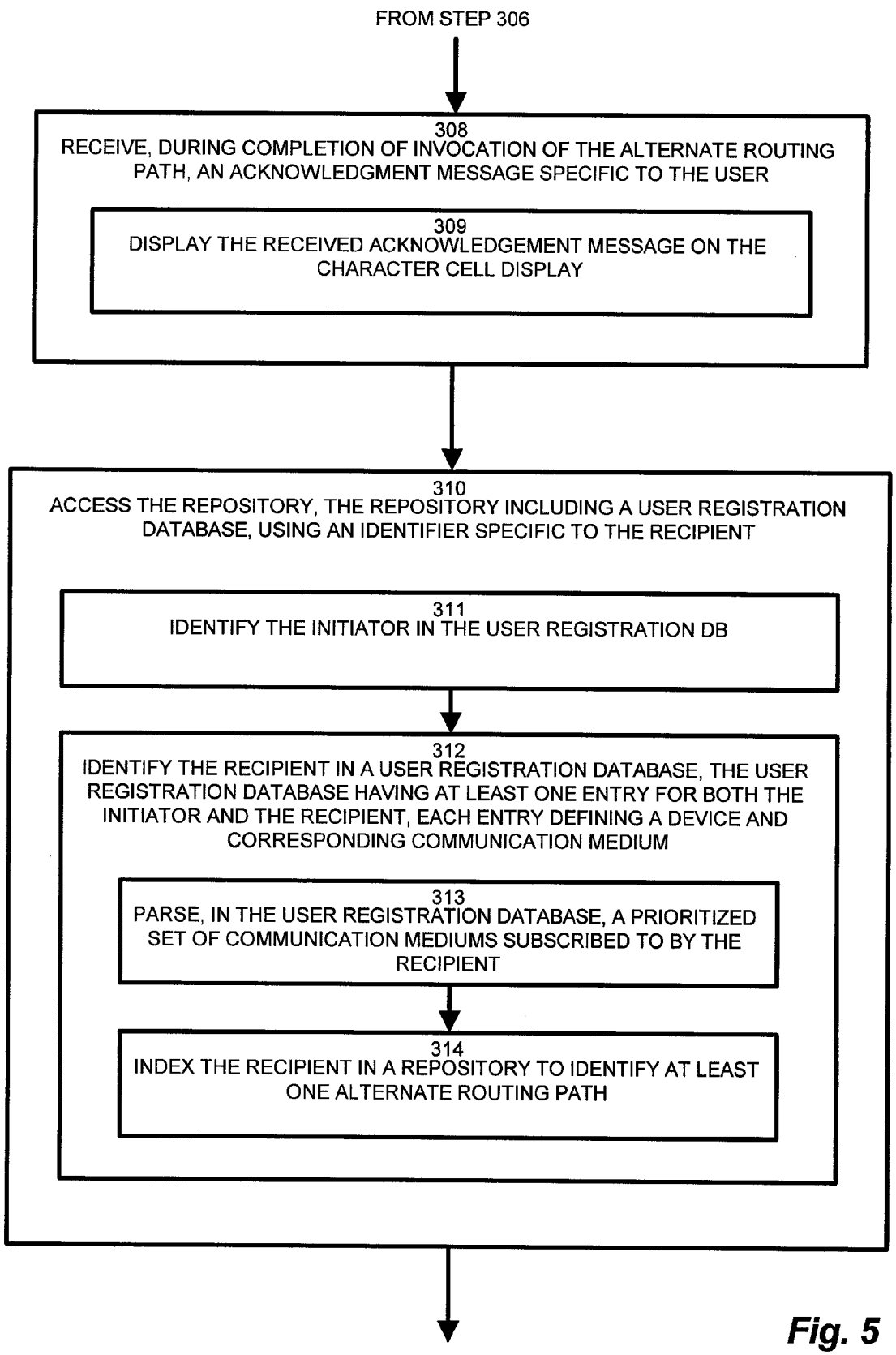
Figure 6:
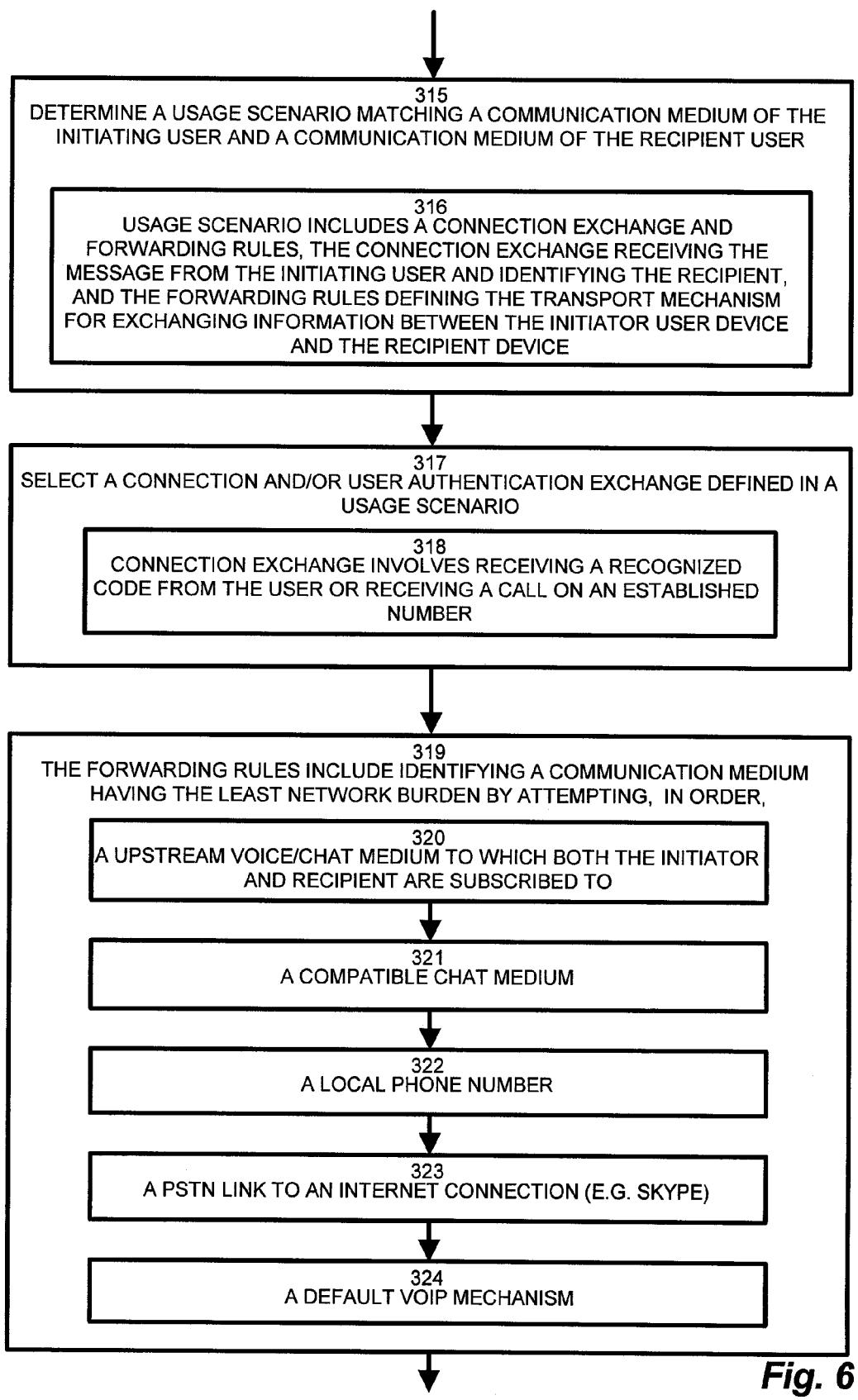
Figure 7:
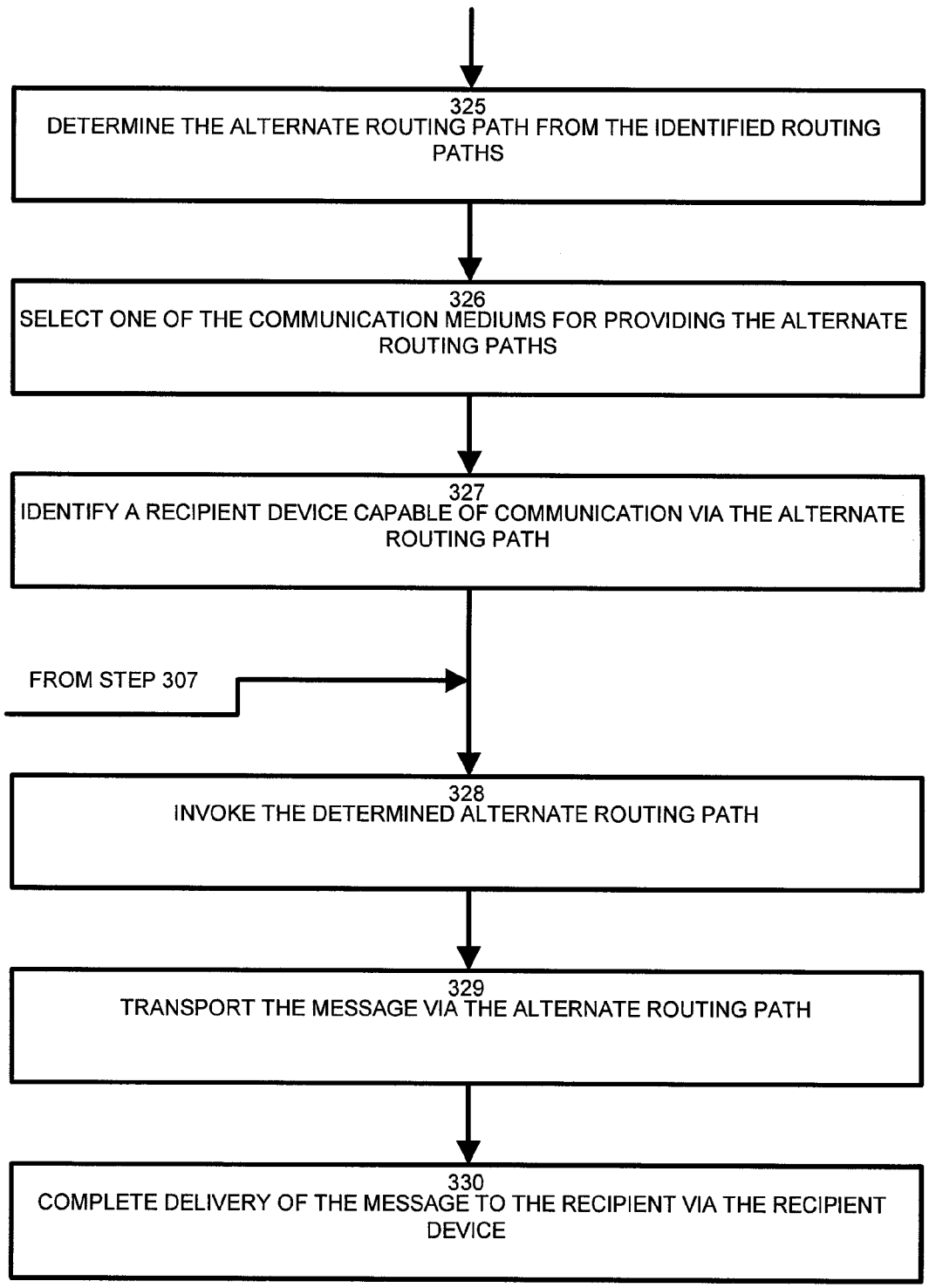

FIG. 3 is a block diagram of call and messaging transport as defined in FIG. 2. Referring to FIGS. 1 and 3, the handoff point 136 denotes the interception device 137 including a switching selector 150 and a switching interface 152, collectively defining the interception device 137. An incoming network 144-1 . . . 144-3 (144 generally) depends on the default network invoked by the user, which is typically expected to be a fee-for-services implementation that the disclosed configurations seeks to avoid. The interception device 137 is disposed at a point such that it may recognize and intercept outgoing calls from the VOIP 144-1, mobility/cellular 144-2, or PSTN 144-3 networks initially accessed by an initiator 112. The switching selector 150 identifies a call or communication 132 from a user device 110 on behalf of a user 110', collectively defining the initiator 112, to a recipient 122 defined by a recipient device 122-N and user 122'. The switching selector 150 identifies the alternate transport path 124 for the communication 132, and the switching interface 152 routes the communication 132 from the conventional PSTN or Mobility network 131 to the alternate network 134 to avoid the fee metered section 133 of the network 130. This re-routing is done via a "Voice Proxy" function. The "Voice Proxy" function terminates the signaling, media and messaging from 112 and re-generates them in a format that is conductive with the alternate network 134. The alternate network 134 maintains several subnetworks, including Voice over IP (VOIP) 134-1, Upstream Voice/Chat network 134-2, mobility/cellular 134-3, and twisted pair PSTN interconnections 134-4 of a null or lesser cost than the conventional network 131. Depending on the services subscribed to and/or available to both the initiator 112 and the recipient 122, the switching selector 150 identifies one or more of the alternate networks 134-1 through 134-4. Additional alternate networks 134-N may be identified.

The switching selector 150 includes a cached subset copy of the global user registration database 154 used and updated by the service providers, henceforth to be simply called "user registration database" for simplicity. The user registration database 154 stores information pertaining to both the initiator 112 and the recipient 122, including the alternate networks 134 and related access information available to the initiator 112 and recipient 122. Using entries in the user registration database 154 corresponding to both the initiator 112 and the recipient 122, the switching selector 150 applies connection rules 156 for identifying the alternate network 134-N, and invokes forwarding rules 158 for determining the mechanism for access and transport across the selected alternate network 134-N, depending on the nature of the communication, such as a single message (i.e. text) or streaming (video, voice) and the devices 122-N available to the recipient 122. The information about the recipient 122 in the user registration database 154 could simply be that 122 is not registered. This and other factors considered, is discussed further below.

FIGS. 4-7 are a flowchart of transport routing logic employed in FIG. 3. Referring to FIGS. 1 and 3-7, the method of establishing network communications in the system of FIG. 3 includes detecting an outgoing message 132 from an initiator 110, in which the outgoing message 132 has a default transport mechanism and a recipient 122, as depicted at step 300 Upon initiation, the communication 132 is destined for the PSTN or Mobility network 131 on a series of links 138 to the recipient 122. In a particular PSTN arrangement, an interface device 111 is connected to the PSTN line through the telephone for accessing the twisted pair line for utilizing logic similar to the well known caller ID functionality. Particular configurations may include interfacing a character cell display to a recipient device, such that the character cell display is invoked for receiving text from the selected communication medium, as disclosed at step 301. Such an interface allows text display as received in a caller ID format or other arrangement, and allows tone recognition from the telephone keypad, discussed further below with reference to a PSTN interface device.

Briefly, such an interface device allows text messaging and text entry on PSTN telephones that operate in conjuncture with the messaging service disclosed herein. It uses the familiar facilities of DTMF, CallerID and Announcements to allow users to enter and display or sound short strings to facilitate text entry or limited text messaging on and towards PSTN telephones. Such a device has several (typically one or two) text display lines and corresponding electronics for operating between the switching selector 150 TDM interface and a CallerID enabled telephone. The basic building block for input of characters is the standard DTMF ("touch-tone") key pad. The basic building blocks for the output of characters are announcements if no CallerID display is available, or some form of CallerID display—either a standard one built into the phone, or a proprietary externally attached interface device. Henceforth this device will be identified as a UPMS ("Universal PSTN Messaging Service") key chain.

The interception device 137 serves to intercept the message at the intermediate point 136 in the transport network 130 for transporting the message 132 to the recipient 122, as depicted at step 302. The intermediate point, shown as handoff point 136, is a network location just prior to the message 132 entering a fee metered section 133 of the transport network 130, as shown at step 303. The message or communication 132 may further comprise a plurality of messages 132' between the initiator 112 and the recipient 122, as depicted at step 303. As indicated above, the message 132 may define a streaming or sequential exchange such as a voice call or streaming media, as opposed to a single packet instance.

After the initiator 112 places the call or otherwise initiates the communication 132, a connection interval ensues after the network switching and routing activity for identifying and transporting the communication 132 to the recipient 122 has occurred and the recipient 122 is being alerted. In conventional circles, this connection interval is referred to as the "ringback," a period during which the initiator 112 (caller) hears a "ringing" in conventional systems. Configurations herein send, during the connection interval between the alerting and completing delivery of the message 132, a connection acknowledgement 135 indicative of identification of the initiating user 110', as disclosed at step 304. The connection acknowledgment 135 may take a variety of forms, such as a greeting, a personal message from the recipient, or other alternative ringback tone. In particular arrangements, such as those disclosed further in the copending application cited above, the connection acknowledgment further includes targeted media selected based on anticipated responsiveness by the user, in which the selection is performed using predetermined demographics applicable to the user 110', as depicted at step 305.

The service depicted herein strives to establish and maintain a user registration database 154 having all users and communication mediums centrally arranged. As an alternative or interim measure, the alternate network identification is performed by manual user selection. Accordingly, a check is performed, at step 306, to determine if the user (initiator) 110' has manually selected the alternate path 124, such as for a known Skype® recipient, or if the service selector 150 performs the selection. Further details on the user selected path are discussed below. Further, if an unrecognized/non subscribing user is detected such that the service selection 150 cannot identify an alternate routing path, an external service such as SkypeOut® may be invoked. If the check at step 306 indicates a user selected path, then the service selector 150 directs the interface 152 to compute at least one of several alternate routing paths from the intermediate point 136 to the recipient 122, using the user specified medium, such that the alternate routing paths 124 are different than the default transport mechanism 131 and common to the recipient 122 and the initiator 112, and further have preferable communication attributes to the default transport mechanism 131, as disclosed at step 307.

Referring now in detail to the user registration database 154, creation of the user registration database 154 provides an underlying infrastructure for matching initiators 112 to recipients 122. This database 154 is to be used by the service provider of the interception device 137 for user identification, authentication and security, connectivity establishment, selection of targeted user advertising and billing. The user registration database 154, in the example disclosed, invokes a distributed architecture to be able to scale the magnitude of entries expected to reside there. A master user registration database is maintained by a service provider, and each interception device employs a local cached copy which would be a subset of the entries of that boxes' service provider's database as well as entries of all the other service providers' databases to which this box has made a call and performed a lookup. Various distributed database propagation and update mechanisms may be employed, as are known in the art. The example database 154 represents the logical retrieval of user registration information supported by such a distributed system. Initial creation and population of the user registration database 154, in particular configurations, may be as follows:

a. User 110' logs in into a web site, and registers. User provides an ID and a password, or some other unique identifier.

a.1 In the case the user is a PSTN network subscriber, the identifier could be the home phone number and a predetermined pin.

a.2 If the user is a Mobility network subscriber, the unique identifier could be the Mobile number. This input could be authorized by sending a random authentication code to that mobile number and asking the user to enter the authentication code to continue with the registration. This is similar to the "Login to Mobile" feature that many service providers like Yahoo® Messenger utilize today.

a.3 If an interface device 111 as described above (such as via a UPMS key chain or similar personal device) is distributed by the service provider, the unique identifier could be stored in a small non volatile memory in the key chain.

b. If service providers are not utilizing a registration web site for signing up users, the same information can be collected and registered by the service provider using a toll free number. In this case, to make the process of registering simple and straight forward, the user can authorize the PSTN, or Mobility or VOIP service provider to use existing stored records for that user-subscriber in their database—such as date of birth, billing address etc.

c. In the process of registration the user provides all their contact information. Specifically, for example:

Home, Mobile or Work phone numbers;

Phone numbers associated with VOIP service providers that use MTAs or IP Phones with TR-69 based or proprietary authentication and provisioning;

Email addresses with talk/chat capabilities such as Google®, Hotmail®, Yahoo®, etc. . . . Along with passwords;

Talk/chat program handles such as AIM, Skype®, etc. along with passwords;

Web2.0 ID's of services with talk/chat capabilities invoking public domain websites such as FaceBook®, MySpace™, etc. along with passwords;

d. User can provide a "dial plan"—for incoming calls in different times of the day/week, the service should try to access him at different numbers and services, with different priority and with different number of retries.

e. User can enter contact information for frequently dialed destinations and assign "aliases" to them—e.g. "111=1-888-5551212", "112=mymail@aim.com", etc.

f. Service provider may choose to collect some demographic info about user at the time of registration such as—education level, ethnic background, income level, hobbies, etc. . . . This is to allow better targeted advertising to the user when they use the service.

g. The service providers may choose in their deployment to designate UserIDs as a unique worldwide. Then they could be used for "dial by name" ID service. Also, this would have the added benefit of allowing users to use their registration info worldwide, without having to re-register in different countries. A mechanism needs to exist between service providers to ensure that these IDs are indeed unique and unambiguous. The details of provisioning UserIDs, ensuring their uniqueness and the mechanics of querying these databases may be defined in detail via appropriate protocols and published through promulgation mediums such as the IETF "Request For Comments" mechanisms. Together, the mechanism of querying the User Registration Databases and resolving user info, user attributes for value added advertizing and the optimal redundant path selection, constitutes a new functionality that can be termed "Voice-DNS" since it is to a large extent similar in intent and spirit to TCP/IP data DNS (domain name service and domain name resolution).

The user registration database 154 is maintained by the service provider of the service selector 150 via fully redundant, 24/7 availability data centers, accessible through a high speed, secure data network such as 10G Ethernet. Such registration employs sufficient caching and propagation mechanisms to provide timely registration data, as discussed above with respect to distributed database implementations for the interception devices 137. A robust manner to implement such a data center would be to use some optimal DBMS format for storing the information and XML format for querying the records using some protocol similar to TR-69. This would be done using SSL for security and reliability.

Once the user registration database 154 exists, the service provider needs to roll out the service by using service selector 150 boxes installed in selected local exchanges, alongside the PSTN or Mobility or VOIP infrastructure. These boxes 150 have TDM interfaces (such as switching interface 152) to traditional PSTN or Mobility equipment, IP interfaces to Next Generation PSTN or Mobility equipment and IP interfaces towards the Internet.

The service selector 150 is operable to determine one or more preferred or optimal alternate paths 124 based primarily on cost considerations, but may also include other factors. During this computation, the initiator 112 receives, during completion of invocation of the alternate routing paths 124, an acknowledgment message 135 specific to the user, as depicted at step 308. As alluded above, the connection acknowledgment message 135 may be computed in a variety of forms by the service selector 150. In a specific configuration, an interface UPMS device displays the received acknowledgement message on a character cell display, as shown at step 309.

Configurations herein purport to identify no-cost alternatives to the default PSTN routing path 131. Therefore, the service selector 150 attempts to match the initiator 112 and recipient 122 with a cost free (i.e. Internet) medium that is accessible to both. Accordingly, computing the alternate routing paths 124 includes accessing a repository, in which the repository includes a user registration database 154, using an identifier specific to the recipient 112, as depicted at step 310. The user registration database 154 includes, for each user, the communication mediums available and the devices 120 applicable to each communication medium. In this manner, the user registration database 154 operates as a universal directory for users 110 that indicates applicable mediums and devices 120, in contrast to conventional approaches that are specific to a particular medium (i.e. Yellow Pages). For example, a user 110 need not know whether a potential recipient 112 user has a Skype® account or a VOIP enabled phone; the recipient 112 is accessed using an identifier that returns all available mediums for reaching that recipient. Accordingly, the service selector 150 first identifies the initiator 112 in the user registration database 154 to assess available mediums, as shown at step 311. This is a significant component of "Voice-DNS". The service selector 150 identifies the recipient 122 in the user registration database 154, in which the user registration database 154 has at least one entry for both the initiator 112 and the recipient 122, such that each entry defines one or more devices 120 and corresponding communication mediums, as depicted at step 312. This includes parsing, in the user registration database 154, a prioritized set of communication mediums subscribed to by the recipient 122 to identify preferable mediums as selected by the recipient 122 user, disclosed at step 313. The information about the recipient 122 in the user registration database 154 could simply be that 122 is not registered. In that case, the selection for the recipient is still done with optimal cost considerations in mind, depending the actual media and service provider that the recipient is using. For example, if the recipient is a regular E.164 telephone number, SkypeOut® can be used to reach them. Alternatively, if the destination is an Upstream Voice/Chat network UserID that is simply not registered, a direct connection is possible.

The service selector 150, using information indicative of the communication mediums of the initiator 112, indexes the recipient 122 in the repository 154 to identify at least one alternate routing path 124 based on mediums common to both the initiator 112 and the recipient 122, as depicted at step 314.

Typically, the alternate path 124 will fit one of several common usage scenarios concerning the mediums available to both users (initiator 112 and recipient 122). Each usage scenario performs particular steps for transporting the communication 132 to the recipient 122 via the alternate path 124. For each usage scenario, the connection rules 156 indicate which medium to employ to establish communication with the recipient 122, and the forwarding rules 158 indicate how to traverse the alternate path 124. For example, a PSTN voice call may be switched to a VOIP call if the recipient subscribes to a VOIP service. Alternatively, if both the initiator 112 and recipient 122 are Skype® users, the switching selector 150 will invoke a Skype® connection. Other usage scenarios are outlined below. Accordingly, the service selector 150 determines a usage scenario matching a communication medium of the initiating user 110' and a communication medium of the recipient user 122', as defined at step 315. The identified usage scenario includes a connection exchange determined by the connection rules 156 and forwarding rules 158, such that the connection exchange receives the message from the initiating user 112 and identifies the recipient 122, and the forwarding rules 158 define the transport mechanism for exchanging information between the initiator user device 110 and the recipient device 122, as depicted at step 316.

From the identified usage scenario, therefore, computing one or more alternate routing paths 124 further includes selecting a connection exchange defined in the usage scenario, as shown at step 317. Such a connection exchange may be thought of as an authentication of users not immediately recognized by the interception device 137. In other words, depending on the transport medium (i.e. subscribed services) available to both the initiator and the recipient, and may require password or PIN entry, or the entry of a credit card in the event that an alternate non-fee transport cannot be identified. In particular usage scenarios, therefore, the connection exchange involves receiving a recognized code from the user or receiving a call on an established number, such as a dialed PIN or user ID, as shown at step 318. An established PIN may also be employed to initiate a user selected alternate path, discussed above with respect to step 307. The connection exchange may also involve other steps, as defined in the connection rules 156, and discussed further below.

Depending on the usage scenario, the forwarding rules 158 specify the manner of transport for the communication 132 and any additional messages 132', such as in the case of a voice exchange or streaming media. Accordingly, the switching interface 152, responsive to the service selector 150, applies the forwarding rules 158 by identifying a communication medium having the least network burden, as depicted at step 319, by attempting, in order, an Upstream Voice/Chat network medium to which both the initiator and recipient are subscribed to, as shown at step 320; an otherwise compatible Upstream Voice/Chat network medium, shown at step 321; a local phone number; as disclosed at step 322; a PSTN link to an Internet connection (e.g. SkypeOut®), as depicted at step 323, and a default VOIP mechanism (step 324). In any case, if the service selector determines that there is no common medium between the initiator 112 and recipient 122, but both sides are registered, a "borrowing" mechanism for a temporary UserID for the destination from the common Upstream Voice/Chat network service provider can be utilized. This temporary UserID would be released back to the Upstream Voice/Chat network as soon as the call is terminated. If the sides are not registered, the call simply will terminate.

The switching interface 152 determines the alternate routing path 124 from the identified routing paths in the usage scenario, as shown at step 325. Typically the alternate routing path 124 selected is the first one found having no fee, however other factors such as performance may be prescribed by the connection rules 156. The switching interface 152 selects one of the communication mediums for providing at least one of several alternate routing paths 124, as depicted at step 326, and identifies a recipient device 122 capable of communication via the alternate routing path 124, as shown at step 327. Depending on the communication mediums attributed to the recipient 122 in the user registration database 154, there may be multiple devices 122 associated with a particular medium capable of receiving the communication 132 in the selected common medium.

The switching interface 127 invokes the determined alternate routing path, as shown at step 328, which may be the user selected in the case of manual user selection (step 307). The selected network 134-N transports the message via the alternate routing path 124, as depicted at step 329, and the selected network 134-N completes delivery of the message to the recipient via the recipient device 122-N, as disclosed at step 330. Particular details about specific usage scenarios disclosed above are discussed in further detail below.

As introduced above, the service selector 150 identifies a usage scenario based on the initiator 112 and recipient 122 capabilities, and determines connection rules 156 and forwarding rules 158 for effecting communication between the initiating 112 and recipient 122 users. Configurations herein depict the following exemplary usage scenarios; alternate arrangements may encompass others.

PSTN:

1. On a PSTN phone such as a pay phone or a house phone the user picks up handset and dials a special access code (i.e. 9999). The local exchange identifies the special access code as a unique route and routes the call to a local Service selector box.

2. If option #1 is not feasible then instead user picks up handset and dials a "local" PSTN access number (i.e. 555-9999). The local exchange forwards this call within the network of local switches up until the CO in which the service selector box 137 is installed and where this call can be routed to it. Typically this should be the last CO up to which this call can be forwarded without incurring any charges from the service provider.

Mobility:

1. User dials a special access code (i.e. 9999) using the Mobile handset. The Mobile Switching Center (MSC) identifies the special access code as a unique route and routes the call to a local service selector box.

2. If option #1 is not feasible then instead user dials a "local" Mobile number (i.e. 555-9999). MSC forwards this call within the network of local switches up until the service selector box which is installed in the same service provider's Mobile or PSTN (in case of GSM or CDMA) or VOIP (in case of 3G) network.

VOIP:

1. On a VOIP phone such as a PSTN phone connected through an MTA, or a true "Ethernet" VOIP Phone such as a IP Phone, the user picks up handset and dials a special access code (i.e. 9999) or "star code". The softswitch (VOIP server) at the service provider's network identifies the special access code as a unique route and routes the call to a local service selector box. The service selector box could be installed either within the VOIP network or could be in the PSTN in continuation of the VOIP service provider's network.

2. In the case of VOIP service provider—the "option #1" is ALWAYS possible.

3. Service selector box's 150 location in the service provider network (PSTN or Mobility or VOIP) is essentially the "last free" location for forwarding the call from the user without the service provider incurring any charges. Some guidelines have been suggested in step #1 and #2 for all 3 scenarios, but final deployment considerations are with the service providers themselves. Regardless of service selector box's 150 location 137, it receives the call 132 specified in step #1 or step #2.

4. PSTN and VOIP:

The service selector box 150 plays an announcement 135 asking the user 110 to identify himself. User may identify himself either through "voice to text" functionality that may be built into the service selector box provided it's implementation is not too expensive, or simply by spelling his name—letter by letter using DTMF with simple scrolling algorithm that plays a very short announcement 135 that pronounces the names of letters and after a longer timeout—plays everything that has been spelled so far. This algorithm will be described in details in a later section dealing with UPMS. For VOIP "IP Phones" it may be possible to use the editing capabilities of the phone above and beyond simple DTMF.

Mobility:

The service selector box 150 identifies the subscriber (user 110) using the unique mobile identifier stored in the SIM module of the handset and sends a query to the User Registration Database 154. If the UserID is not found the service selector box plays an announcement 135 telling that the user is not registered to use this service and prompts the user to register for the service by providing the web URL and or options to contact the customer support for assisted registration and disconnects the call.

5. PSTN or VOIP with MTA (not Relevant for Mobility or for IP Phones):

If the phone has a CallerID screen or if user has an interface device such as the special UPMS key chains and chooses to use it for this call 132, the name spelling could be done by using the CallerID approach discussed above. The initial announcement 135 in step #4 would advise the user if the CallerID format announcement is supported or not.

6. PSTN and VOIP (steps #6 and #7):

When spelling is completed by the user, the service selector box will send a query to the "User Registration Database". If the UserID is found and confirmed as an active user, the service selector box 150 plays an announcement 135 asking the user to provide a password. If the UserID is not found or if the password is not matching, the service selector box plays an announcement 135 telling the user that this entry is not valid, and offering him either to re-enter UserID and password, or to accept this as a paid call and enter his credit card number. The credit card is operable for a conventional fee for services call or may invoke a temporary unregistered user usage scenario.

7. If the user wants to start over UserID entry, repeat algorithm from step #4, up to 3 times. If the user is not able to enter correct UserID more than 3 times, the service selector box plays fast busy and terminates the call.

8. PSTN and VOIP:

If the UserID and password are matching with the user registration database 154, the service selector box plays an announcement 135 to the user to enter the destination record identifier. That could be a unique "dial by name ID" of a fellow service user, or a destination ChatID in a Voice/Chat or Web 2.0 service or simply an E.164 format PSTN, VOIP or Mobile phone number (E.164 is a standard promulgated by the International Telecommunications Union, or ITU, for standardizing international telephone numbers, as is known in the art).

Mobility:

If the UserID is found in the "User Registration Database", the service selector box 150 plays an announcement 135 to the user to send the destination record identifier as a short message or using the "*xxx#" signaling mechanism currently popular with Mobility providers. That destination could be a unique "dial by name ID" of a fellow service user, or a destination ChatID in a Chat or Web 2.0 service or simply an E.164 format PSTN or VOIP or Mobile phone number. It should be emphasized that in order to use the service to make outgoing calls user has to be registered in the user registration database", but to receive incoming calls, the user does not have to be registered and he can receive calls on any PSTN, Mobile, VOIP, Chat or Web 2.0 service.

9. PSTN or VOIP with MTA:

To determine if the destination is a "dial by name ID" or ChatID or phone number or a "frequently dialed destination", the service selector box checks the first digit pressed by the user. A "0" or "1" DTMF digit which has no letter designations on the standard phone key pad, designates that the digits to be dialed are an E.164 format phone number (for example 1-800-5551212). A "#" or a "*" DTMF digit which also has no letter designation on the standard phone key pad, designates a "frequently dialed destination". If the first digit is any of the DTMF digits "2" through "9"—it designates a letter. A scrolling algorithm is to be applied for letter collection as specified in step #4

Mobility and IP Phones:

To determine if the destination is a "dial by name ID" or ChatID or phone number or a "frequently dialed destination", the service selector box 150 checks the first character sent by the user. A number "0" or "1" is an E.164 format phone number (for example 1-800-5551212). A "#" or a "*" character designates a "frequently dialed destination". The destination is a chat ID if it is in the standard email format. If none of the above matches, it is treated as "dial by name ID"

10. This step specifying the forwarding rules 158 of the service selector 150 service is common for all three cases (VOIP 134-1, Mobility 134-2 and PSTN 134-3) unless otherwise denoted. Once the destination record identifier has been collected from the user 110, the service selector 150 network of devices attempts to match it to User Registration Database 154 network, ensuring record location and uniqueness. If the match is not made, the service selector box 150 validates the destination record identifier further to see if a connection is still possible, assuming the record is a valid phone number, Voice/ChatID or Web 2.0 ID.

Once the matching and "sanity checks" are done, the service selector box finds the cheapest way to reach the destination using the following rules:

10a. If the destination is a "dial by name ID" (e.g., query the details of the "dial plan" specified in the "User Registration Database" for that ID. Then proceed to dial based on the rules of the "dial plan". If the dial plan is not specified for the destination, use the rules specified in sections 10g or 10h if only phone number is registered for that destination. Otherwise use a compatible Voice/ChatID.

10b. If the destination is a Voice/ChatID, use the same voice/chat service if the user has registered for it. For e.g. if the destination is a Yahoo® account and the user has registered a UserID and password for Yahoo®, service selector logs into Yahoo® Messenger on behalf of the user and establishes a chat and voice session with the destination. The instant messages to be sent out as chat can be typed in using the DTMF dial pad using the CallerID display of the interface device or a UPMS key chain and the incoming messages are displayed on the CallerID display for the case of PSTN or MTA based VOIP. In the case of IP Phones or Mobile Handsets the messages are exchanged as SMS between the service selector box and mobile. The SMS could either old TDM based SMS for CDMA and GSM or "SIP Msg" based one for newer Mobility standards and IP Phones.

The voice path is connected from the local handset to the service selector box as whatever is the default standard for media transport is for that network (i.e. TDM for PSTN voice, TDM and/or IP for Mobility and RTP for VOIP) and from the service selector box to the other side, as RTP or something equivalent.

10c. If the destination is a Voice/ChatID and the user has not registered or the same chat service, try to find an alternative chat service which is compatible with the destination. At the very minimum, both services should support voice communication between their users.

10d. If the destination is a Voice/ChatID and the user has not registered for the same or compatible chat service, play an announcement 135 that the call cannot be established based on the information provided by the user. Then go back to step #8.

Alternatively, if the initiator 112 is conversant in the so called Web 2.0 mechanism (i.e. such as that offered by Yahoo® Chat for example) but the destination recipient 122 is merely an E.164 number, one particular implementation of connecting them would be for service selector to figure out if remote E.164 is in an area where the service selector 150 is also offered, and if it is—query the remote service selector 150 for some temporary, spoofed chat handle and connect the call as a common service (i.e. Yahoo® Chat to Yahoo® Chat).

In this manner, on a day to day basis, the Web2.0 providers will give a pool of spoofed IDs (temporary IDs not associated with real people) on their networks, to the service selector 150 via the deploying service providers. The service selector 150 is responsible for seizing these spoofed IDs, using them in a call and then releasing them back. The advantage to the Web 2.0 providers is that in a Yahoo® to Yahoo® call, additional advertising revenue can flow to the medium provider even if one side only is real and the other side is spoofed. The advantage for the Telco service provider is that Yahoo® to Yahoo® call incurs no cost.

10e. If the destination is a phone number in the same area code as the local exchange, use direct PSTN or Mobile or VOIP call to connect to the destination if it comes at no cost to the service provider.

10g. If the destination is a phone number and the user has entered credentials for Skype® or any other service that supports calls to PSTN, use the given service (SkypeOut®) to connect to the destination.

10h. Alternatively to 10g.—if the destination is a phone number and the user registered a phone number from a VOIP service provider, that service provider's network can be used to make the call. This is generally equivalent to taking the concept of "Mobile TA" popular today and integrating it to the service selector box. However, in order for this to work, there has to be a trusted relationship between the service selector box 150 service provider and the VOIP service provider. The registration and authentication usually requires a private key and MAC ID of the MTA used in user's home.

However, based upon an agreement with the service providers—an alternative registration and authentication mechanism can be worked out for the service selector box, that would be parallel to the home MTA and would not disable it.

As a general concept, the "User Registration Database" is a more expedient way of registering users for VOIP service providers. VOIP service providers should migrate to usage of the "User Registration Database" for signing up users for their services, to simplify their provisioning infrastructure. A much smaller database is required for the VOIP service provider. They only need to "point" to the User's record in the "User Registration Database" and store billing info and whether user is active. Other information can be offloaded.

In this case the call would be routed to that VOIP service provider's network, and the billing would be based on the agreement that the user has with the VOIP service provider. It should be understood that the special case concerning VOIP in section 10h. is because unlike Mobility and PSTN, which are both very mature networks—VOIP mass deployment is a phenomenon of the last 4-5 years only. Not all the standards and deployment practices are mature and there is still a good window of opportunity to influence the way VOIP service is deployed using service selector technology in the network, unlike Mobility and PSTN, where service selector box 150 enhances and integrates mature systems.

If none of 10.a through 10.h are available, service selector box plays an announcement 135 to the user that there is no way to make the call due to insufficient balance and drops the call. Once the most efficient way to reach the destination recipient 122 is determined and when dialing proceeds, service selector box 150 plays an announcement 135 telling the user what service is it going to use to connect his call.

11. All the while, while all the logic described in details in step #10 is executed, which could take as long as 20-50 seconds, the service selector box could coordinate streaming of audio "jingle" advertisement data 135 to the user. Such a selection of advertising data could be based on user's current location, for example, or a variety of others factors, as discussed further in the copending application cited above. For a PSTN phone, the location could be determined performing a lookup in a 911 database of PSTN telephone numbers.

For mobility contexts the user's 110 location is determined either by triangulating location of the handset in relationship to a few well known cell towers, or by Assisted GPS. For VOIP, some service providers track the location of MTAs or IP Phones but as a general rule, the mechanisms for that are still proprietary and ad-hoc and not well defined.

e.g. if the user is using a phone in the vicinity to a major shopping mall—a configuration may play advertising for select merchants in the mall. If the location cannot be determined, or is not desirable, advertising selection and tuning could be done based on the demographic info described above.

Streaming advertising would allow providing the service for free to the user. Associated advertising revenue by the service provider needs to be tracked and accounted for, to provide a share to the Telephony, Mobility, VOIP, Upstream Voice/Chat network providers, so that they would allow access to their network to the service selector service.

Industry standard advertising content provider APIs like Google® would be used, and "Registration User Database" would be compatible with them. User would be identified, location and/or preferences would be used to match a set of attributes that would be sent to the advertising provider using this API, and the most optimized "sound byte"-"jingle" advertising would be selected and streamed through service selector.

12. As the initiator 110 commences dialing, the service starts a "busy/no answer" timer in the service selector box 150. If within the period of timer expiry the voice path has not connected—play a busy tone towards the user 135 and revert to #8 above.

The service selector 150 does not allow text chatting without establishing a voice path first, as it is an unpractical usage scenario. A caveat to this general rule would be bulk advertising using the interface UPMS device or SMS facility in service selector boxes. There is a purpose for sending "multicast" advertising and announcement messages to all the subscribers in a CO serviced by a service selector box. In that case, a short text message could be sent to users with their PSTN or VOIP phone on hook, to their CallerID display, using CallerID type I, or to mobile handsets as SMS (Short Message Service).

The user selected path option as depicted in step 307 provides an interim and/or less invasive implementation since it does not require the "User Registration Database" and the complex logic required in steps 1-11. This approach would make the service selector box and service cheaper and easier to install but it would fall into the category of an interim remedy and a short term solution to generate revenue. It would serve to allow voice and text communications to chat service users from Voice/Chat service users.

In this configuration, the service selector box 150 would still have TDM interfaces towards traditional PSTN equipment and/or TDM or IP interfaces towards the Mobility equipment in the MSC and/or IP interfaces towards Next Generation PSTN and VOIP equipment and IP interfaces towards the internet and those boxes would still be installed in selected local exchanges or MSCs, alongside the other infrastructure. User Database Registration network will be non-existent.

In the PSTN or VOIP case the service selector box 150 would prompt 135 the user to select chat service (1—for Yahoo®, 2—for MSN® . . . ), then use the input methods described in step #4 and #5—to enter the service's UserID and Password. In the Mobility case the service selector box would prompt the user to send the user ID as SMS or using "*xxx#" signaling.

Once the user is registered, the service selector box 150 will take care of voice traffic forwarding and text chat to CallerID conversion. The voice path is connected from the local handset to the service selector box as Mobile/PSTN voice, and from the service selector box to the other side, as RTP or something equivalent. The text chatting would be done using the interface UPMS key chain device 111 mechanism and CallerID display or SMS between the service selector box 150 and the mobile handset 110.

This service would most likely be provided by the chat service providers, as opposed to the main purpose where the service providers would be the telephone companies. Even though demographic information is not available in this scenario because of lack of "User Registration Database", still advertising based on geographical location is possible, based on a lookup in a 911 database of PSTN telephone numbers, or Mobility Triangulation or Assisted GPS.

UPMS—Universal PSTN Messaging Service (Device):

Since service selector 150 usage is envisioned mostly while users are off hook, either entering their UserID, password and destination record identifier for initiating the service or while having a voice conversation using service selector, the UPMS interface device 111 uses Type II CallerID. Type II CallerID is ideally suitable for this purpose since a new Type II CallerID string can be sent from the service selector box as often as every 500 msec or so and it will be displayed continuously without limits by most of the standard CallerID phones on the market.

This is different from Type I CallerID. Most standard CallerID phones on the market will only display up to around 12 messages in between rings, before stopping display all together. Hence Type I CallerID is only practical for "Multicasting" a message to a pre-programmed or instantly defined set of subscribers. For example—School Districts can send notification to parents of Students; Police Departments can send alerts to residents of neighborhoods, etc. . . . The message would be a short one, asking the user to call a number and retrieve their full message. That number would be routed to the same advertising server that streams advertising data to service selector users while they are dialing. This is an additional and secondary usage of the interface device 111 and it does not involve any character input, only string display on standard CallerID phones.

The standard CallerID phones on the market are limited in their ability to display strings in the CallerID field. Only MDMF format of CallerID message can be used, using an FSK or V.23 modulation. This is due to the fact that strings can only be sent in the "Name" field of CallerID message and only MDMF format has the "Name" field. If strings are sent in the "Number" field of the CallerID message—it confuses all the standard CallerID phones on the market. The length of the strings sent is limited to 16 characters; a standard CallerID phone will not display more than 16 characters.

Due to these considerations two possible solutions exist for UPMS functionality on PSTN phones without CallerID, or as a better alternative to the standard CallerID phone.

1. Sounding out of the messages using short announcements 135 "letter by letter";

2. An external CallerID device of some form. To be called the UPMS "key chain" throughput this document, to designate the ideal desired form factor. This would be a small device with a coin size battery, non volatile storage to contain the access dial number for the service selector and authentication data for the user, a microprocessor and an LCD display. This "key chain" device may not have the same 16 character restrictions in displaying CallerID message data that standard CallerID phones have. It would work in MDMF format, and hence it would allow usage of the interface device 111 even in countries that use SDMF by default and where the standard CallerID phones are SDMF based. The device would be coupled to the PSTN phone using the modular 4 wire interface connector between the handset and the base of the phone. It is an industry standard interface with 2 wires for ear piece and 2 wires for mouth piece. Our "key chain" would interface to the 2 wires of the ear piece to intercept and display the FSK signals during CallerID messaging, and also to mute the earpiece after reception of the CAS signal. The "key chain" interface device would also interface to the 2 wires of the mouth piece to send the ACK signal after muting the earpiece, and also to send the access dial number and authentication data of the user for logging in to service selector service. The dial number and authentication data would be sent based on a special DTMF key sequence entered by the user or by the service selector box.

In addition to that, a new set of protocols is emerging by major European service providers (Deutche Telecom and Telecom Italia)—SMS service over PSTN. This service also uses FSK, but without the restrictions of CallerID messaging. It defines a new data link layer protocol and requires new PSTN phones. The composing of messages will be done by special letter keys, and DTMF will no longer be used for letters input in this new protocol. The service selector box will be implementing these protocols and will be compatible with these phones. With these phones, full voice and text messaging simultaneously will be possible.

It is envisioned that the service selector box would be compatible with these new PSTN SMS phones as well, in addition to UPMS functionality, which has the obvious advantage of not requiring a new phone.

The interface device 111 may be interfaced using logic employing the DTMF feature commonly known as providing tones to keys. The DTMF phone key mapping is done using an array. The PSTN phone has 12 DTMF keys total. They are "1" through "9", "*", "#" and "0". The pressing of each key should represent one or more character, or special function.

A digits-to-characters-map array ("DCM_arr") of 12 members of 2 attributes each—"string" and "maximum number of characters in the string" is used for the "scrolling through characters" function. It should be initialized as shown in TABLE I:

DCM_arr[i]={"string", "integer"}={DTMF dig "1"} DCM_arr[0]="1,DOT,@", max_num_chars=3;
{DTMF dig "2"} DCM_arr[1]="ABC2", max_num_chars=4;
{DTMF dig "3"} DCM_arr[2]="DEF3", max_num_chars=4;
{DTMF dig "4"} DCM_arr[3]="GHI4", max_num_chars=4;
{DTMF dig "5"} DCM_arr[4]="JKL5", max_num_chars=4;
{DTMF dig "6"} DCM_arr[5]="MNO6", max_num_chars=4;
{DTMF dig "7"} DCM_arr[6]="PQRS7", max_num_chars=5;
{DTMF dig "8"} DCM_arr[7]="TUV8", max_num_chars=4;
{DTMF dig "9"} DCM_arr[8]="WXYZ9", max_num_chars=5;
{DTMF dig "*"} DCM_arr[9]="DEL", max_num_chars=1;
{DTMF dig "0"} DCM_arr[10]="SPACE,0", max_num_chars=2;
{DTMF dig "#"} DCM_arr[11]="SEND", max_num_chars=1;
Table I The service selector box 150 implementing the interface device 111 algorithm detects each DTMF key press, decodes it and translates it to characters based on the mapping in the array above. If a key is pressed repeatedly, the user intent is to choose the next character represented and the algorithm will scroll character by character through all the characters that are mapped for that key. A timeout means that the user has chosen that character and moved on to entering the next character. A longer timeout will trigger the service selector box to sound or send the whole string entered by the user thus far.

The sounding option is implemented using short announcements 135 where every letter sound is a separate announcement. The Sending using CallerID message Type II is following the modified short CallerID protocol—service selector box sends directly CAS message (without sending SAS first) and after receiving ACK sends the MDMF CallerID message. The message is sent in the "Name" field and should not be significantly longer than 16 characters.

The building of the string is accumulative and it will be accumulated and periodically sent whenever there is a longer timeout until the user presses "SEND" character option. At that point the string will again be sent but a new string will start accumulating. Some line editing emulation facilities using the "DEL" and "SPACE" character options can be implemented and supported by the service selector 150 box.

Alternative configurations may provide enhancements such as those outlined below.

1. For PSTN:

The service selector together with the UPMS functionality could be implemented as a unified platform, or a distributed model, where the signaling proxy and switching portion of the service selector functionality is built into a Telco Soft Switch and the media and messaging proxy together with UPMS for PSTN functionality of the service selector 150 is built into an Telco MRS (Media Resource Server). In that case, the UPMS logic described above could be triggered by passing a known message in the non standard field of gateway control protocols used by the MRS.

2. For PSTN:

The service selector 150 may be implemented as an AIN intelligent service by configuring the control logic for signaling proxy and switching in a Telco SCP and the media and messaging proxy and switching service selector 150 functionality built into a Telco MRS. In this case the command to trigger the message 132 alternate path 124 could be sent to the SSP using the non-standard field in "promptCollectUserMessage" and could be passed to the MRS using the non-standard field in the gateway control protocol used. This may incorporate modification of AIN framework in the SSP to support the UPMS interface device 111.

For all 3 scenarios (PSTN, Mobility and VOIP):

3. Add the ability to conference between users. One user calls multiple users; also applicable are call waiting alert, call hold, and many other Class 5 Telephony and Enterprise PBX voice features. This is possible because the service selector box 150 combines the functionality of signaling, media and messaging switch and proxy. The signaling, media and messaging traversing between the service selector 150 boxes could in some instances be regenerated by the boxes as secure, encrypted signaling and media, thus ensuring a high level of trust and confidence usually associated with IP Enterprise Voice applications.

4. In conjuncture with item #3 immediately above, there is the option to terminate unsuccessful calls between 2 parties that both use this service and are registered in the registration database on a unified, universal voice mailbox provided by the service providers as part of this service. The voice mailbox would be accessible for free from anywhere this service is available, with the same targeted advertizing streamed during the ringback period, and advanced voice to text functionality could be provided to prescribe the voice message and send them via text (SMS or UPMS) back to the user's handset (home phone or Mobility handset).

5. "True Redundancy" feature. If both the parties are service selector users that use this service with registration database entries, when the call routing decision is made in step #10— the "second best" and "third best" route are also calculated and stored. As the call on the "Best" route is ongoing, the service selector box 150 can monitor the dropped packets and VQT and other call metrics, and if we see the call is about to drop, automatically "second best" route can be brought up. As soon as the "best" call fails the "second best" call can be switched into. This is essentially a "warm standby" feature.

Those skilled in the art should readily appreciate that the programs and methods for establishing network communications as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for establishing network communications has been particularly shown and described with references to embodiments thereof, it will be understood by those skilled in the art that various changes in form and details may be made therein without departing from the scope of the invention encompassed by the appended claims.

What is claimed is:

1. A method of establishing network communications comprising:

detecting an outgoing message from an initiator, the outgoing message having a default transport mechanism and a recipient;

intercepting the message at an intermediate point in a transport network for transporting the message to the recipient, the intermediate point being a network location just prior to the message entering a fee metered section of the transport network, the message further comprising a plurality of messages between the initiator and the recipient;

computing at least one alternate routing path from the intermediate point to the recipient, the alternate routing path different than the default transport mechanism and common to the recipient and the initiator, and having preferable communication attributes to the default transport mechanism, computing further comprising:

identifying the recipient in a user registration database, the user registration database having at least one entry for both the initiator and the recipient, each entry defining a device and corresponding communication medium; and determining, from the defined communication mediums, a communication medium common to both the recipient device and the initiating device, the preferable communication attributes of the common communication medium defining fewer imposed fees for the alternate routing path;

transporting the message via at least one of the alternate routing paths;

identifying a recipient device capable of communication via at least one of the alternate routing paths; and completing delivery of the message to the recipient via the recipient device.

2. The method of claim 1 further comprising sending, during a connection interval between the intercepting and completing delivery of the message, a connection acknowledgement indicative of identification of the initiating user.

3. The method of claim 2 wherein the connection acknowledgment further comprises targeted media selected based on anticipated responsiveness by the user, the selection performed using predetermined demographics applicable to the user.

4. The method of claim 1 wherein computing alternate routing paths further comprises:

indexing the recipient in a repository to identify at least one alternate routing path;

determining the alternate routing paths from the identified routing paths; and invoking a particular one of the determined alternate routing paths.

5. The method of claim 4 wherein computing the alternate routing paths comprises accessing the repository, the repository including a user registration database, using an identifier specific to the recipient;

parsing, in the user registration database, a prioritized set of communication mediums subscribed to by the recipient;

selecting one of the communication mediums for providing at least one of the alternate routing paths; and invoking a voice proxy function for terminating a signaling media employed for transport from the initiator and regenerating the outgoing message in a signaling media conforming to the selected communication medium.

6. The method of claim 5 further comprising:

interfacing a character cell display to the initiator via an initiator device, the character cell display for receiving text from the selected communication medium;

invoking, in the character cell display, logic for interpreting caller id signals for display on the character cell display, and for receiving tone signals from the initiator device indicative of the outgoing message;

receiving, during completion of invocation of the alternate routing path, an acknowledgment message specific to the user; and displaying the received acknowledgment message on the character cell display.

7. The method of claim 1 wherein computing at least one of several alternate routing paths further comprises selecting a connection exchange defined in a usage scenario, further comprising:

identifying the initiator in the user registration database;

identifying the recipient in the user registration database;

determining a usage scenario matching a communication medium of the initiating user and a communication medium of the recipient user.

8. The method of claim 7 wherein the usage scenario includes a connection exchange and forwarding rules, the connection exchange receiving the message from the initiating user and identifying the recipient, and the forwarding rules defining the transport mechanism for exchanging information between the initiator user device and the recipient device.

9. The method of claim 8 wherein the connection exchange involves receiving a recognized code from the user or receiving a call on an established number;

the forwarding rules include identifying a communication medium having the least network burden by attempting, in order:

a Voice/Chat medium to which both the initiator and recipient are subscribed to;

a compatible Voice/Chat medium;

a local phone number;

a PSTN link to an Internet connection; and

A default VOIP mechanism.

10. The method of claim 8 wherein transporting the message includes invoking forwarding rules to identify at least one of the several alternate paths, further comprising identifying the initiator and the recipient in the user registration database to identify available calling mediums for each of the initiator and recipient;

if the destination is a dialed voice number to the identified recipient, determine a telephone number and invoke an Internet medium for completing the communication;

if the destination is a ChatID, determine if the initiator is operable in the same Voice/Chat medium;

if the initiator and recipient are operable in the same Voice/Chat medium, invoke the common Voice/Chat medium for completing the communication; and if a common Voice/Chat medium is not available, identify if the recipient is operable in a Voice/Chat medium compatible with the initiator Voice/Chat medium.

11. The method of claim 7 wherein the message is a voice call such that delivery of the message initiates voice communication between an initiating device initiating the outgoing message and the recipient device, the voice communication having predetermined bandwidth requirements.

12. The method of claim 8 further comprising:

identifying if a common Voice/Chat medium exists between the initiator and recipient;

determining if a switching node for implementing the forwarding rules is available to the recipient via the common Voice/Chat medium;

selectively providing, if a common Voice/Chat medium exists, a spoofed ID corresponding to the recipient for the purpose of completing the communication; and completing the communication through the provided Voice/Chat medium.

13. The method of claim 1 further comprising:

interfacing an interface device with the initiator via an initiator device, the interface device having a character cell display and responsive to CalledID encoding, interfacing responsive to message traffic between the switching device and the initiator device;

receiving, from the initiator device, keypad tones generated by a keypad on the initiator device;

translating the received tones into text, the text defining a text message;

sending the defined text message to the switching device as an outgoing message;

receiving incoming text, the incoming text defined according to a caller ID encoding; and displaying, by decoding the received caller ID text, the incoming text on a character cell display.

14. A network switching device for establishing network communications comprising:

an interface to a transport network for detecting an outgoing message from an initiator device, the outgoing message having a default transport mechanism and a recipient, the interface disposed at an intermediate point in the transport network for intercepting the message and transporting the message to the recipient;

connection rules for computing at least one alternate routing path from the intermediate point to the recipient, the alternate routing path different than the default transport mechanism and common to the recipient and the initiator, and having preferable communication attributes to the default transport mechanism;

forwarding rules for transporting the message via the computed alternate routing path;

an interface to the alternate network for identifying a recipient device capable of communication via the alternate routing path, the interface for completing delivery of the message to the recipient via the recipient device; and a user registration database for identifying the recipient, the user registration database having at least one entry for both the initiator and the recipient, each entry defining a device and corresponding communication medium, the connection rules for determining, from the defined communication mediums, a communication medium common to both the recipient device and the initiator device, the preferable communication attributes of the common communication medium defining fewer imposed fees for the alternate routing path.

15. The switching device of claim 14 wherein the intermediate point is disposed at a network location just prior to the message entering a fee metered section of the transport network, the message further comprising a plurality of messages between an initiator and the recipient.

16. The switching device of claim 14 wherein the connection rules select a connection exchange defined in a usage scenario, further comprising:
   identifying the initiator in the user registration database;
   identifying the recipient in the user registration database;
   determining a usage scenario matching a communication medium of the initiating user and a communication medium of the recipient user.

17. The switching device of claim 16 wherein the switching device includes a plurality of switching devices, the usage scenario further includes forwarding rules such that the forwarding rules compute the alternate routing path by:
   indexing the recipient in a repository to identify at least one alternate routing path;
   determining the alternate routing path from the identified routing paths; and
   invoking the determined alternate routing path, computing the alternate routing path further comprising:
      accessing the repository, the repository including a user registration database, using an identifier specific to the recipient;
      parsing, in the user registration database, a prioritized set of communication mediums subscribed to by the recipient, the user registration database defined by a cached subset distributed across the plurality of switching devices; and
      selecting one of the communication mediums for providing at least one of the alternate routing paths.

18. A network switching device for establishing network communications comprising:
   an interface to a transport network for detecting an outgoing message from an initiator device, the outgoing message having a default transport mechanism and a recipient, the interface disposed at an intermediate point in the transport network for intercepting the message and transporting the message to the recipient;
   connection rules for computing at least one alternate routing path from the intermediate point to the recipient, the alternate routing path different than the default transport mechanism and common to the recipient and the initiator, and having preferable communication attributes to the default transport mechanism;
   forwarding rules for transporting the message via the computed alternate routing path;
   an interface to the alternate network for identifying a recipient device capable of communication via the alternate routing path, the interface for completing delivery of the message to the recipient via the recipient device; and
   an interface device, the interface device having a character cell display and being responsive to caller ID signals, the interface device further including:
      an initiator interface to the initiator device, the initiator interface for receiving keypad tones;
      a service interface to the switching device, the service interface for receiving signals according to a caller ID encoding and for sending outgoing messages to the switching device;
      a tone recognizer for recognizing the keypad tones, the keypad tones being generated by the interfaced initiator device, and
      a text message aggregator, the text message aggregator responsive to the tone recognizer for receiving text input in the keypad, and for sending the received text message to the switching device as an outgoing message.

* * * * *